(12) United States Patent
Matsunaga

(10) Patent No.: US 7,072,882 B2
(45) Date of Patent: Jul. 4, 2006

(54) APPARATUS FOR REPRODUCING VIDEO, STILL IMAGES, AUDIO AND TEXT FROM DATA BASED UPON A PROCESSING ORDER

(75) Inventor: Keishi Matsunaga, Inagi (JP)

(73) Assignee: Denon, Ltd., Kanagawa (JP)

( * ) Notice: Subject to any disclaimer, the term of this patent is extended or adjusted under 35 U.S.C. 154(b) by 772 days.

(21) Appl. No.: 10/092,413

(22) Filed: Mar. 5, 2002

(65) Prior Publication Data

US 2003/0046662 A1 Mar. 6, 2003

(30) Foreign Application Priority Data

Aug. 30, 2001 (JP) ............................. 2001-262261

(51) Int. Cl.
*G06F 17/30* (2006.01)

(52) U.S. Cl. ............................... 707/3; 717/9; 717/115

(58) Field of Classification Search ..... 707/100–104.1, 707/3–6; 717/115, 9; 386/95, 46
See application file for complete search history.

(56) References Cited

U.S. PATENT DOCUMENTS

| | | | |
|---|---|---|---|
| 5,376,842 A | 12/1994 | Honoa et al. | |
| 5,475,811 A * | 12/1995 | Neumann et al. | 345/473 |
| 5,748,499 A | 5/1998 | Trueblood | |
| 6,102,970 A * | 8/2000 | Kneipp | 717/155 |
| 6,201,538 B1 | 3/2001 | Wugofski | |
| 6,211,974 B1 * | 4/2001 | Haneda | 358/527 |
| 6,275,529 B1 * | 8/2001 | Sato | 375/240.01 |
| 6,772,125 B1 * | 8/2004 | Harradine et al. | 704/278 |
| 6,826,745 B1 * | 11/2004 | Coker et al. | 717/115 |
| 2002/0007493 A1 | 1/2002 | Butler et al. | |

FOREIGN PATENT DOCUMENTS

| | | |
|---|---|---|
| DE | 198 33 053 | 1/2000 |
| FR | 2 768 530 | 3/1999 |
| JP | H1-233489 | 9/1989 |
| JP | H3-9393 | 1/1991 |
| WO | WO 02/17642 | 2/2002 |

OTHER PUBLICATIONS

Thomas Mayer-Boudnik et al., "MHEG: An interchange format for interaktive multimedia presentations", Reihe Informatik Jul. 1994—Universität Mannheim, Seminargebäude A5 68131 Mannheim, Online! 1995.
Rob Koenen, "MPEG-4 Multimedia for our time", IEEE Spectrum, Online! Feb. 1999.
Thomas Mayer-Boudnik et al., "MHEG Explained", IEEE MultiMedia, Spring 1995, pp. 26-28.

* cited by examiner

*Primary Examiner*—Debbie Le
(74) *Attorney, Agent, or Firm*—Koda & Androlia

(57) ABSTRACT

A data reproduction apparatus which reproduces data based on script data, in which a script execution location specifying section modifies the execution location held in a table when output data from an output section that outputs an input code, time code or clock data coincides with an input code, time code or clock data held in a table; and a script analysis and execution section executes processing that corresponds to the commands of the script data, and, it further controls reproduction of data according to reproduction instructions specified at the execution location that is modified by the script execution location specifying section when the output data coincides with the input code, time code or clock data held in the table.

6 Claims, 6 Drawing Sheets

FIG. 2

| | |
|---|---|
| ;START SCRIPT | ···201 |
| ONRTCGO 1 XX-XX-XX/12:00:00 12JI | ···202 |
| ONVITCGO 1 00:00:02:00 MENU | ···203 |
| ONKEYGO 1 1 KEY1 | ···204 |
| #MENU0 | ···205 |
| SETTC 00:00:00:00 | ···206 |
| PREROLL MENU.MPG | ···207 |
| WAIT | ···208 |
| #MENU | ···209 |
| PLAYGO | ···210 |
| PLAY MAIN.MPG | ···211 |
| GOTO MENU0 | ···212 |
| #12JI | ···213 |
| STOP | ···214 |
| PLAY 12JIHOU.WAV | ···215 |
| GOTO MENU0 | ···216 |
| #KEY1 | ···217 |
| STOP | ···218 |
| ONKEYGO 1 %OFF | ···219 |
| PLAY SPECIAL.MPG | ···220 |
| ONKEYGO 1 2 KEY1 | ···221 |
| GOTO MENU0 | ···222 |

APPARATUS FOR REPRODUCING VIDEO, STILL IMAGES, AUDIO AND TEXT FROM DATA BASED UPON A PROCESSING ORDER

BACKGROUND OF THE INVENTION

1. Field of the Invention

The present invention relates to a data reproduction apparatus that reproduces video, still images, audio, text, and other data based on a processing order that is set in advance.

2. Prior Art

Reproduction apparatuses used in electronic publishing, presentations and other fields perform reproduction of video, still images, audio, text, and other data based on a script file in which the timing for starting data reproduction, the timing for ending data reproduction, etc. are described. Such a reproduction apparatus is disclosed in, for instance, Japanese Patent Application Laid-Open (Kokai) No. H1-233489.

In addition to descriptions of the timing for the start and end of data reproduction, etc., the script file may also contain descriptions of the timing for displaying data presentation instruction buttons that issue instructions for data presentation. The reproduction apparatus displays data presentation instruction buttons with a prescribed timing based on the script data descriptions; and if the user selects a data presentation instruction button during display of the data presentation instruction button, the data for which the presentation instruction has been issued is presented at that time. Such a reproduction apparatus is disclosed in, for instance, Japanese Patent Application Laid-Open (Kokai) No. H3-9393.

The reproduction apparatus disclosed in Japanese Patent Application Laid-Open (Kokai) No. H1-233489 reproduces video, still images, and other data based on script data that is set in advance. Accordingly, during the reproduction of the data set in advance, it is not possible to reproduce data that is other than the data set in advance. For example, even if the user issues an instruction by way of an operation means so as to begin reproduction of still image data during reproduction of video data, the reproduction apparatus reproduces video data without reproducing still image data. Hence when the reproduction apparatus is used in, for example, a presentation, data other than that set in advance is not reproduced. Thus, the reproduction apparatus is inconvenient.

In the case of the reproduction apparatus disclosed in Japanese Patent Application Laid-Open (Kokai) No. H3-9393, a data presentation instruction button that issues instructions for the presentation of data is used interactively so that the user can decide data output. However, in this apparatus, it is necessary to set the timing for displaying the data presentation instruction button, to set the period of time for displaying the data presentation instruction button, and to set a link to related data for executing the reproduction of the data determined in advance when the data presentation instruction button is selected. Consequently, when the number of data presentation instruction buttons is increased and the number of links to related data is increased, then the description of the program for displaying the data presentation instruction buttons and for making a link to related data become complex, thus increasing the volume of data in the script file.

In the case of conditional statements ("if" statements and the like) in BASIC, C and other programming languages, when a single-line conditional statement is executed, other routines cannot be executed. As a result, in order to write a program that, while executing a routine to reproduce certain data, reproduces data different from such data when a key determined in advance is pressed, numerous conditional statements must be used. Thus, the program becomes complex.

In addition to reproducing a plurality of data items determined in advance following a certain order, there is a need to reproduce, at a specific time, data determined in advance and different from such data or to output a plurality of different video clips or still images synchronously to a plurality of display output devices. Such needs cannot be addressed through a program that uses conditional statements ("if" statement, for instance) in a BASIC, C or other programming language so as to cause reproduction and output of data according to time information by way of using simple descriptions. If a program that employs conditional statements ("if" statements, for instance) is used to execute data reproduction and output according to time information, the program description becomes complex.

SUMMARY OF THE INVENTION

Accordingly, it is an object of the present invention to provide a data reproduction apparatus that executes a program, by means of a file with concise descriptions, so as to perform operations to start reproduction of data upon user input, to start reproduction of data at a time set in advance, and to output a plurality of different data items synchronously.

The above object is accomplished by a unique structure for a data reproduction apparatus that comprises:

a data accumulation means that accumulates a plurality of types of data;

a data reproduction means that reproduces data;

a user operation input means that outputs input codes which correspond to input by user operation;

a table that holds input codes determined in advance and execution locations which are executed when the input codes are inputted;

a script execution location specifying means that, when an input code from the user operation input means and the input codes held in the table coincide, modifies the execution locations held in the table; and a script analysis and execution means that holds a script file which contains a description specifying an execution location in the script file for execution upon user operation input, and which recognizes commands described in the script data and executes processing corresponding to these commands; wherein when the input code from the user operation input means and the input code held in the table coincide, then the script analysis and execution means performs control to reproduce data according to a reproduction instruction specified at the execution location that is modified by the script execution location specifying means.

The above object is further accomplished by another unique structure for a data reproduction apparatus that comprises:

a data reproduction means that reproduces data;

a clock data output means that outputs clock data;

a table that holds clock data and an execution location, the clock data being determined in advance, and the execution location being executed at a time of the clock data;

a script execution location specifying means that, when clock data from the clock data output means and clock data held in the table coincide, modifies the execution location held in the table; and, a script analysis and execution means that holds a script file which contains a description specifying an execution location in the script file for execution at the time of the clock data determined in advance, the script analysis and execution means further recognizing commands described in the script data and executing processing that corresponds to the commands; wherein when the clock data from the clock data output means and the clock data held in the table coincide, then the script analysis and execution means performs control to reproduce data according to a reproduction instruction specified at the execution location modified by the script execution location specifying means.

The above object is also accomplished by still another unique structure for a data reproduction apparatus that comprises:

a data reproduction means that reproduces data;

a time code input/output means that generates a time code and receives a time code inputted from outside;

a table that holds a time code determined in advance and an execution location which is executed at a time of such a time code;

a script execution location specifying means that, when the time code from the time code input/output means and the time code held in the table coincide, modifies the execution location held in the table; and a script analysis and execution means that holds a script file which contains a description specifying an execution location in the script file for execution at the time of a time code determined in advance, the script analysis and execution means further recognizing commands described in the script data and executing a processing that corresponds to the commands; wherein when the time code from the time code input/output means and the time code held in the table coincide, then the script analysis and execution means performs control to reproduce data according to a reproduction instruction specified at the execution location modified by the script execution location specifying means.

BRIEF DESCRIPTION OF THE DRAWINGS

FIG. 2 shows one example of a script file executed by the data reproduction apparatus according to one embodiment of the present invention;

DETAILED DESCRIPTION OF THE INVENTION

Figure 1:
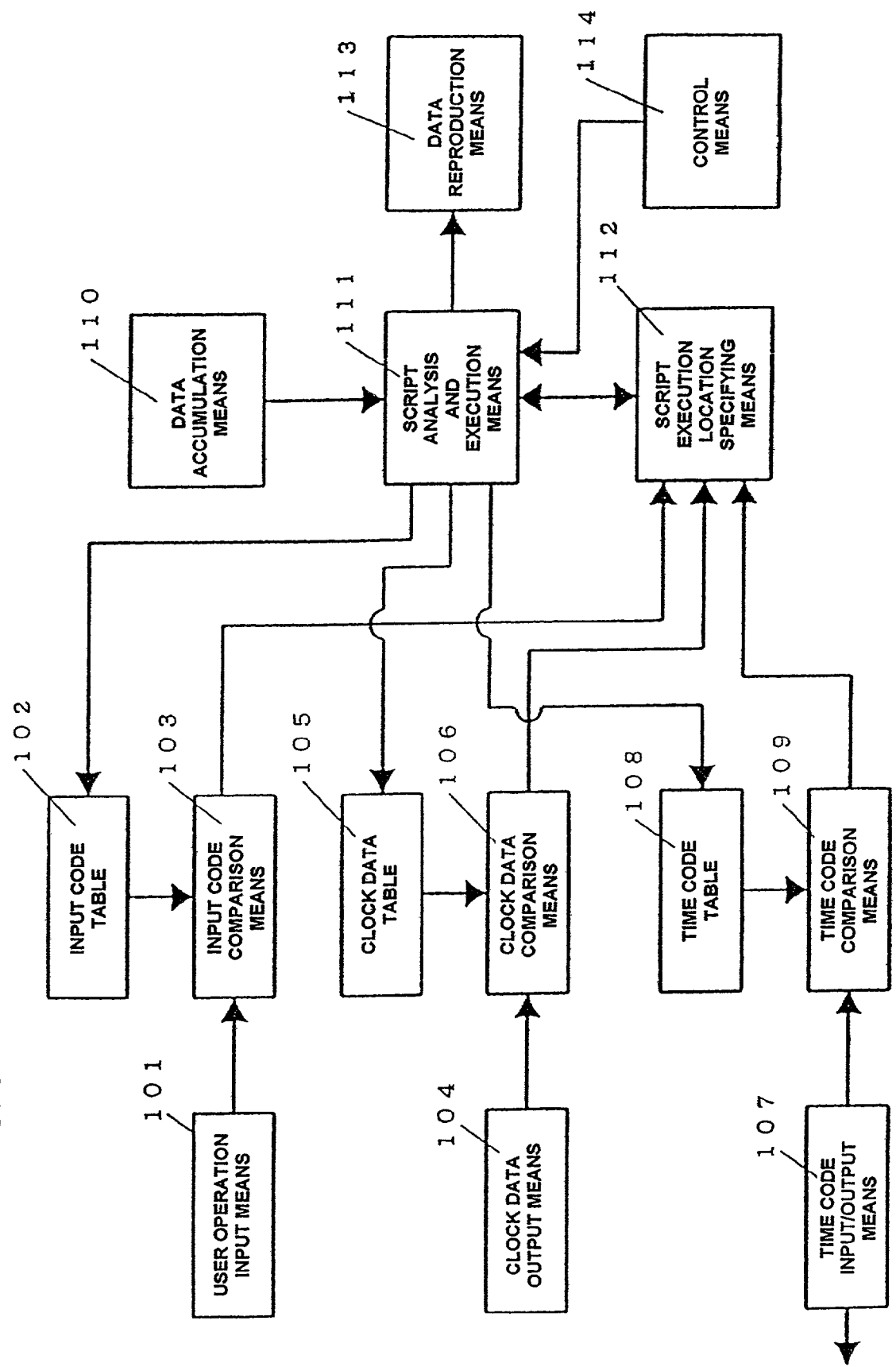
FIG. 1 is a schematic diagram of the structure of the data reproduction apparatus according to one embodiment of the present invention.

FIG. 1 is a schematic diagram showing the structure of the data reproduction apparatus according to one embodiment of the present invention.

In FIG. 1, the data reproduction apparatus comprises a user operation input means 101, an input code table 102, an input code comparison means 103, a clock data output means 104, a clock data table 105, a clock data comparison means 106, a time code input/output means 107, a time code table 108, a time code comparison means 109, a data accumulation means 110, a script analysis and execution means 111, a script execution location specifying means 112, a data reproduction means 113 and a control means 114.

The user operation input means 101 is, for instance, a keyboard or a mouse, and it outputs, as an input code, a key code that corresponds to user key input or pointer coordinates specified by the mouse.

The input code table 102 holds, as one data set, an input code (key code and pointer coordinates) specified in advance by script data, a branch destination and branch enable/disable flag that corresponds to the input code. With this one data set as a single entry data item, the input code table 102 can hold a plurality of entry data items.

Here, the branch destination indicates the line that is executed when conditions specified in advance (branch conditions) are met. The branch destination is described on the same line with the branch conditions in the script data. The branch enable/disable flag is a flag that, in the line in which the branch conditions and branch destination are described, indicates whether branching is to occur when the branch conditions are met. If the flag is set to disable, branching is not performed even if the branch conditions are satisfied.

When, for instance, the code for a key operation "KEY 1" is "1", the input code table 102 holds the code "1", the branch destination that corresponds to the code "1", and a branch enable/disable flag that indicates whether or not branching on code "1" is enabled.

The input code comparison means 103 judges whether the input code from the user operation input means 101 and an input code with branching enabled held in the input code table 102 coincide. If the input codes coincide, then the next scheduled execution position (next position scheduled for execution) held by the script execution location specifying means 112 is modified to the branch destination of the entry data registered in the input code table 102.

The clock data output means 104 measures the year, month, day, hour, minute and second and outputs the current time as clock data.

The clock data table 105 holds, as one data set, clock data that indicates the date and time which are set in advance by script data, a branch destination corresponding to the specified date and time, and a branch enable/disable flag. With this set of data as one entry data item, the clock data table 105 can hold a plurality of entry data items.

The clock data comparison means 106 judges whether the clock data, which is held by the clock data table 105 and for which branching is enabled, and the clock data, which is inputted by the clock data output means 104, coincide. If the clock data coincides, then the next scheduled execution position held by the script execution location specifying means 112 is modified to the branch destination of entry data registered in the clock data table 105.

The time code input/output means 107 generates a time code as stipulated by the SMPTE code, for example, and outputs this to external equipment and to the time code comparison means 109. The time code input/output means 107 also receives a time code inputted from outside and outputs the time code to the time code comparison means 109.

The time code table 108 holds a time code specified in advance by the script data, a branch destination that corresponds to the specified time code, and a branch enable/disable flag as one set of data. With this one set of data as one entry data item, the time code table 108 holds a plurality of entry data items.

The time code comparison means 109 judges whether a time code inputted from the time code input/output means 107 coincides with any of the time codes held in the time code table 108 which have branching enabled. If such time codes coincide, then the next scheduled execution position held by the script execution location specifying means 112 is modified to the branch destination of the entry data item registered in the time code table 108.

The data accumulation means 110 comprises a script holding section, which holds a script file, and a data holding section, which holds video, still images, audio, text, and other data to be reproduced (called "data for reproduction"). The script holding section of the data accumulation means 110 is, for instance, a hard disk drive, memory card reader and the like, that reads a script file stored on media.

The script analysis and execution means 111 reads data for reproduction accumulated in the data accumulation means 110 based on script data and causes such data for reproduction to be reproduced by the data reproduction means 113. The script analysis and execution means 111 is controlled by a control means 114 so as to perform script analysis processing as a task only when a script processing startup flag held by the script execution location specifying means 112 is enabled.

When the script processing startup flag is enabled, the script analysis and execution means 111 proceeds with execution of analysis of the command at the script execution location held in the script execution location specifying means 112. When the script processing startup flag is disabled, the script analysis and execution means 111 temporarily halts execution of analysis of the command at the script execution location held by the script execution location specifying means 112.

When the script processing startup flag is enabled and the task is started, the script analysis and execution means 111 reads the next scheduled execution position held by the script execution location specifying means 112, and then it analyzes and executes the command appearing in order from the position specified by the next scheduled execution position. When processing of this command is completed, the next scheduled execution position held by the script execution location specifying means 112 is modified to the line of the command text which is a subsequent command text on which the processing has ended, thus completing the processing.

The script execution location specifying means 112 holds the execution position in the script to be executed next (called "next scheduled execution position") by the script analysis and execution means 111. The script execution location specifying means 112 holds also the script processing startup flag that indicates whether or not the processing from the execution position is to be performed by the script analysis and execution means 111.

The data reproduction means 113 comprises a decoder and an output means according to the various types of data; and it reproduces video, still image, audio, text, and other data.

The control means 114 controls the script analysis and execution means 111 so that the script analysis and execution means 111 performs script analysis processing only when the script processing startup flag held by the script execution location specifying means 112 is enabled.

FIG. 2 shows one example of a script file executed by the data reproduction apparatus according to one embodiment of the present invention.

In this script shown in FIG. 2, line 202 indicates that when the clock data is "12:00:00", then the lines following the line that has the label "12JI" are to be executed. Line 203 indicates that when the time code is "00:00:02:00", then the lines following the line that has the label "MENU" are to be executed. Line 204 indicates that when there is a key input or mouse input by the user, then the lines following the line that has the label "KEY 1" are to be executed.

Lines 205 to 208 indicate that the time code is reset to "00:00:00:00", and preparations for reproduction of the file "MENU.MPG" are made and entered into a standby state, respectively.

Lines 209 to 212 indicate that the "MAIN.MPG" file is reproduced, and then execution returns to "MENU0" (line 205).

Lines 213 to 216 indicate that a processing in progress (for example, reproduction of video data) is halted, the "12JIHOU.WAV" file is reproduced, and execution is to return to "MENU0" (line 205).

Lines 217 to 222 indicate that a processing in progress (for example, reproduction of video data) is halted, when a "1" key input is executed the branch enable/disable flag is set to disable, and the "SPECIAL.MPG" file is reproduced, and then, when the "2" key is pressed, a branching destination registration is performed so that branching occurs at the "KEY 1" line.

As seen from the above, the script file contains the script data that is a description specifying the reproduction of specific data from among the video, still image, audio, text, and other data. The script file also contains the script data that is a description specifying, as a result of user operation input, the execution locations in the script file (script data describing instructions for reproduction of specific data).

The reproduction apparatus shown in FIG. 1 includes the data reproduction means 113 which reproduces the above-described video, audio, still images, text and other data; and it further includes the operation input means 101, which recognizes input by user operation, and the script execution location specifying means 112, which specifies the execution location in the script data. When the script analysis and execution means 111 of the reproduction apparatus recognizes the contents of script data, and an input code from the user operation input means 101 coincides with conditions specified within the script file, then the script execution location specifying means 112 modifies the execution location within the script data, and the script analysis and execution means 111 controls the reproduction of data according to reproduction instructions described in order from the location specified by the script execution location specifying means 112.

The script file has script data instructions for reproduction of specific data among video, still image, audio, text, or other data. The script file also has script data instructions that specify execution locations in the script file (script data specifying the reproduction of specific data) at a date and time set in advance.

The reproduction apparatus shown in FIG. 1 includes the data reproduction means 113 which reproduces the above-described video, audio, still images, text, and other data; and it further includes the clock data output means 104, which outputs current date and time information, and the script execution location specifying means 112, which specifies execution location of a script data. When the script analysis and execution means 111 of the reproduction apparatus recognizes the contents of script data, and clock data from the clock data output means 104 coincides with conditions specified within the script, then the script execution location specifying means 112 modifies the execution location within the script data, and the script analysis and execution means 111 controls the reproduction of data according to reproduction instructions described in order from the location specified by the script execution location specifying means 112.

The script file has script data instructions for reproduction of specific data among video, still image, audio, text, or other data. The script file also has script data instructions specifying execution locations in the script file (script data specifying the reproduction of specific data) at the time of a time code determined in advance.

The reproduction apparatus shown in FIG. 1 includes the data reproduction means 113, which reproduces the above-described video, audio, still images, text, and other data; and it further includes the time code input/output means 107, which generates a time code, or receives a time code input from external equipment, and the script execution location specifying means 112, which specifies execution location of a script data. When the script analysis and execution means 111 of the reproduction apparatus recognizes the contents of script data, and a time code from the time code input/output means 107 coincides with conditions specified within the script, then the script execution location specifying means 112 modifies the execution location within the script data, and the script analysis and execution means 111 reproduces data according to reproduction instructions described in order from the location specified by the script execution location specifying means 112; and it also performs control so as to output time codes to external equipment, if necessary.

The operation of the script analysis and execution means 111 will be described in detail below.

Figure 3:
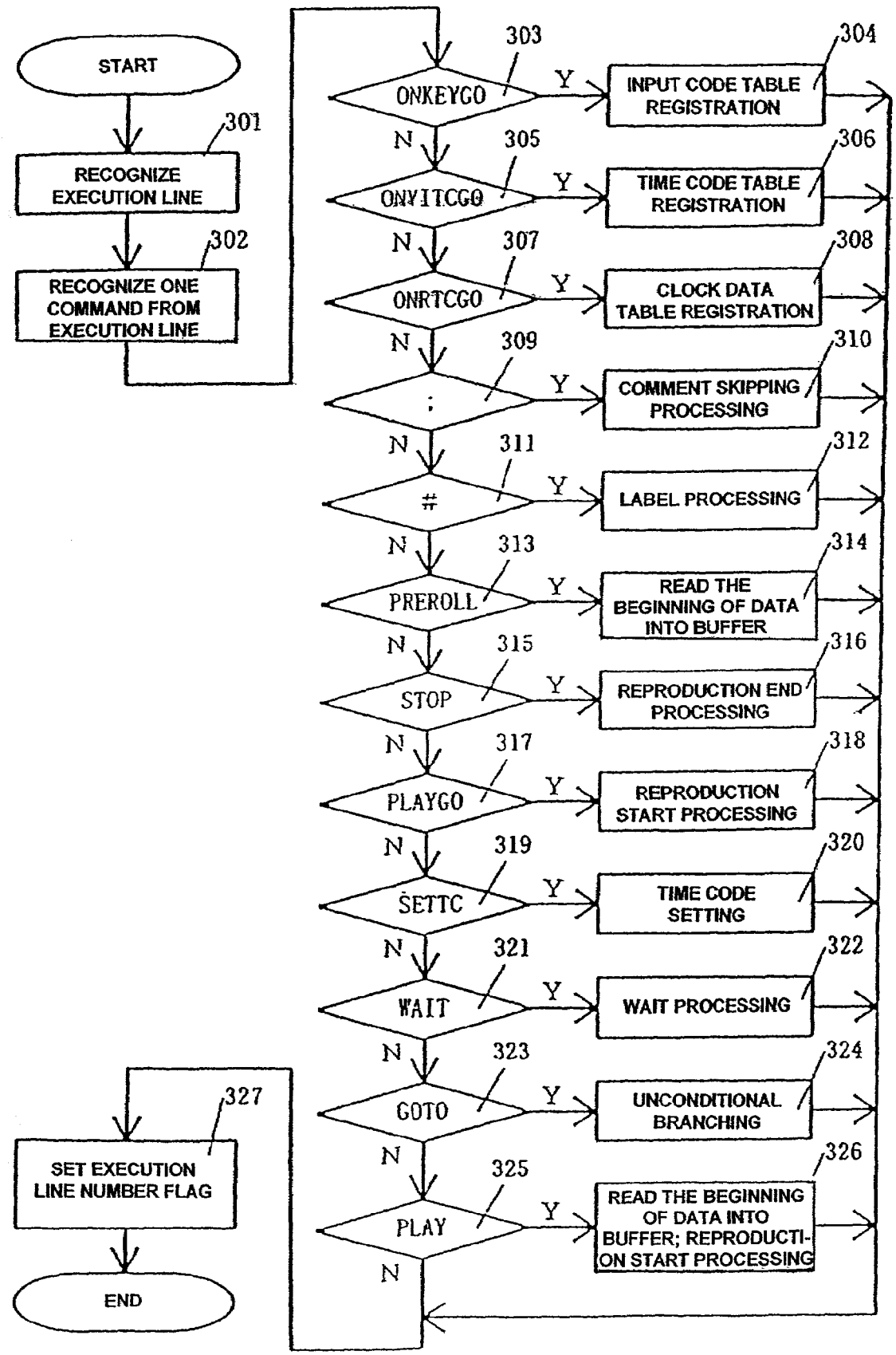
FIG. 3 is a flowchart that shows the operation of script analysis and execution means of the data reproduction apparatus according to one embodiment of the present invention.

FIG. 3 is a flowchart that describes the operation of the script analysis and execution means of the data reproduction apparatus of the shown embodiment.

When the script processing startup flag is enabled, the script analysis and execution means 111 is started as a task by the control means 114, and it first acquires the execution position in the script file that is held by the script execution location specifying means 112 (step 301).

Next, the command at the acquired execution position is recognized (step 302), a judgment is made as to whether the command is an enabled command (303, 305, . . . , 325); and, if it is an enabled command, then processing that corresponds to the command is performed (304, 306, . . . , 326).

After the end of processing of each command, the next scheduled execution position in the script file held by the script execution location specifying means 112 is modified to be the next point of the command text at which processing has ended (the next line after the command for which processing has ended, or, a line specified by the command for which processing has ended), and the script processing startup flag is set according to whether a state is established in which the next command can immediately be accepted (execution line number flag setting). Thus, one task ends (step 327).

When script data is read into the work area of the storage unit 114 of the script analysis and execution means 111, the execution position held by the script execution location specifying means 112 is rewritten to the beginning position of the script data (initialization).

When the script analysis and execution means 111 begins processing, the command ";" in line 201 of FIG. 2 is recognized (step 309). The command ";" is recognized as a comment line by the data reproduction apparatus; therefore, the script analysis and execution means 111 skips the script data, performing no execution through to the end of this line (comment skipping) (step 310) and sets the execution line number flag (step 327).

In step 327, the scheduled execution position held by the script execution location specifying means 112 is modified to the beginning of line 202 which is shown in FIG. 2, the script processing startup flag is enabled, and this cycle of processing by the script analysis and execution means 111 is ended.

If the script analysis and execution means 111 is not executing a task, and the script processing startup flag is enabled, then the control means 114 immediately starts the task of the script analysis and execution means 111.

The task of the script analysis and execution means 111 is started, and the command "ONRTCGO" on line 202 of FIG. 2 is recognized (step 307).

After the command "ONRTCGO" is recognized, in step 308 the script analysis and execution means 111 records 12:00:00 of day XX, month XX, year XX in the first registration position of the clock data table 105, and it further records the beginning position of line 214 in FIG. 2, at which the label "12JI" appears, as the next scheduled execution position. Also, branching at this time is set to enabled.

After recording, the script analysis and execution means 111 sets the execution line number flag (step 327). In processing that sets the execution line number flag (step 327), the script analysis and execution means 111 modifies the execution position held by the script execution location specifying means 112 to be at the beginning of line 203 in FIG. 2, enables the script processing startup flag, and ends this cycle of processing of the script analysis and execution means 111.

The control means 114 starts the task of the script analysis and execution means 111. The command "ONVITCGO" on line 203 of FIG. 2 is recognized by the script analysis and execution means 111 (step 305).

After recognition of the command "ONVITCGO", in step 306 the script analysis and execution means 111 records a time data of 00 hours, 00 minutes, 02 seconds, 00 frames in the first registration position of the time code table 108; and then the script analysis and execution means 111 records the beginning position of line 209 in FIG. 2, on which the label "MENU" appears, as the next scheduled execution position. Also, branching at this time code is set to enabled.

After recording, the script analysis and execution means 111 sets the execution line number flag (step 327). In processing that sets the execution line number flag (step 327), the script analysis and execution means 111 modifies the execution position held by the script execution location specifying means 112 to be at the beginning of line 204 in FIG. 2, enables the script processing startup flag, and ends this cycle of processing of the script analysis and execution means 111.

The control means 114 starts the task of the script analysis and execution means 111. The command "ONKEYGO" on line 204 of FIG. 2 is recognized by the script analysis and execution means 111 (step 303).

After the command "ONKEYGO" is recognized, in step 304 the script analysis and execution means 111 records, in the first registration position of the input code table 102, the key code "1" of the key "A" (not shown) and the beginning position of line 217 in FIG. 2, on which the label "KEY 1" appears, as the next scheduled execution position. Also, branching on this key code "1" is set to enabled.

After recording, the script analysis and execution means 111 sets the execution line number flag (step 327). In processing that sets the execution line number flag (step 327), the script analysis and execution means 111 modifies the execution position held by the script execution location specifying means 112 to be at the beginning of line 205 in FIG. 2, enables the script processing startup flag, and ends this cycle of processing of the script analysis and execution means 111.

The control means 114 starts the task of the script analysis and execution means 11. The command "#" on line 205 in FIG. 2 is recognized by the script analysis and execution means 111 (step 311).

After recognition of the command "#", in step 312 the script analysis and execution means 111 recognizes that the character string following the command "#" is a label name, which is an entry point when the script data requires a discontinuous execution order. As a result, script data is skipped up to the end of line 205 in FIG. 2, and the execution line number flag setting is executed (step 327).

In processing that sets the execution line number flag (step 327), the script analysis and execution means 111 modifies the execution position held by the script execution location specifying means 112 to be at the beginning of line 206, enables the script processing startup flag, and then ends this cycle of processing of the script analysis and execution means 111.

The control means 114 starts the task of the script analysis and execution means 111. The command "SETTC" on line 206 of FIG. 2 is recognized by the script analysis and execution means 111 (step 319).

After recognition of the command "SETTC", in step 320 the script analysis and execution means 111 resets the time code inputted from the time code input/output means 107 to a time data of 00 hours, 00 minutes, 00 seconds, 00 frames; and it also restarts time code generation of the time code input/output means 107 and sets the execution line number flag (step 327).

In processing that sets the execution line number flag (step 327), the script analysis and execution means 111 modifies the execution position held by the script execution location specifying means 112 to the beginning of line 207 in FIG. 2, enables the script processing startup flag, and ends this cycle of processing of the script analysis and execution means 111.

The control means 114 starts the task of the script analysis and execution means 111. The command "PREROLL" on line 207 of FIG. 2 is recognized by the script analysis and execution means 111 (step 313).

After recognition of the command "PREROLL", the script analysis and execution means 111 performs, in step 314, standby processing for reproduction of the file "IMENU.MPG", which is video data; and then it executes a processing that sets the execution line number flag (step 327). In the reproduction standby processing, the beginning of the video data is stored into a buffer (not shown), thus putting the system into the state in which, when there is an instruction to start reproduction, reproduction is immediately started and outputted.

In processing that sets the execution line number flag (step 327), the script analysis and execution means 111 modifies the execution position held by the script execution location specifying means 112 to the beginning of line 208 in FIG. 2, enables the script processing startup flag, and ends this cycle of processing of the script analysis and execution means 111.

The control means 114 starts the task of the script analysis and execution means 111. The command "WAIT" on line 208 of FIG. 2 is recognized by the script analysis and execution means 111 (step 321).

After recognition of the command "WAIT", in step 322 the script analysis and execution means 111 temporarily halts processing based on the script (wait processing) and then executes a processing that sets the execution line number flag (step 327).

In processing that sets the execution line number flag (step 327), the script analysis and execution means 111 modifies the execution position held by the script execution location specifying means 112 to the beginning of line 209 in FIG. 2, disables the script processing startup flag, and ends this cycle of processing of the script analysis and execution means 111.

Figure 4:
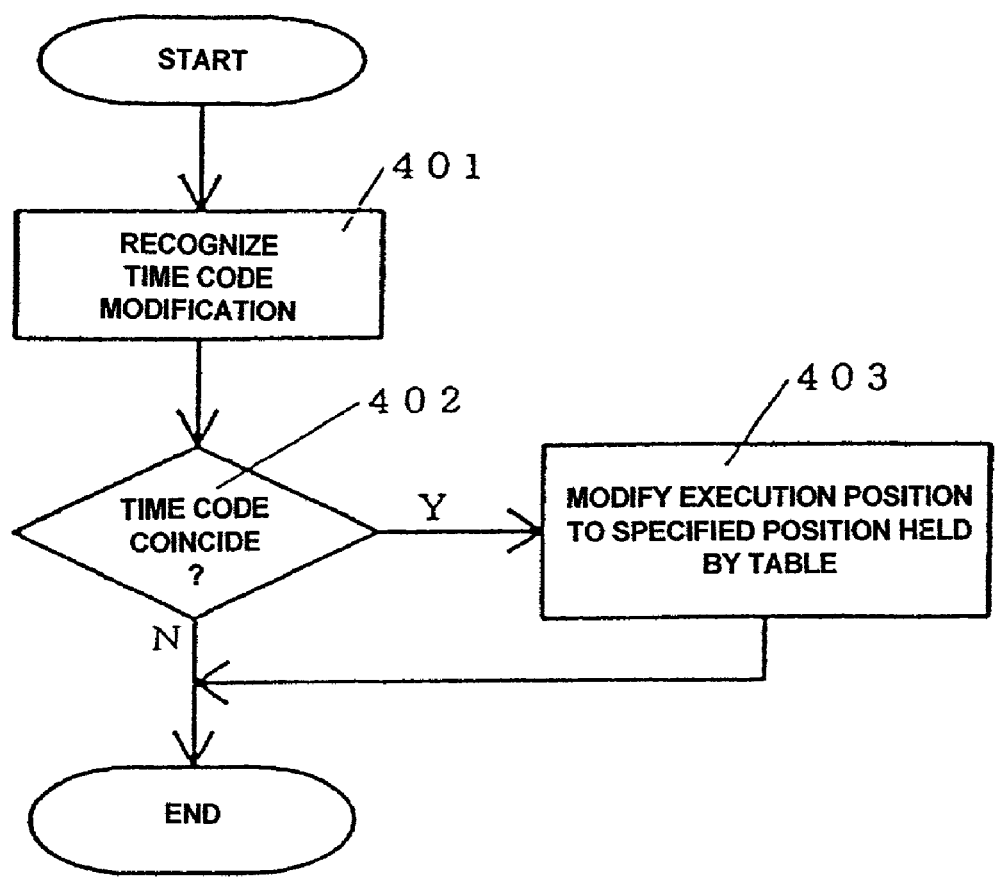
FIG. 4 is a flowchart that shows the operation of time code comparison means of the data reproduction apparatus according to one embodiment of the present invention.

FIG. 4 is a flowchart that describes the operation of the time code comparison means of the data reproduction apparatus of the shown embodiment.

Since the script processing startup flag is disabled in the processing that sets the execution line number flag (step 327), the control means 114 does not start the task of the script analysis and execution means 111 (this state will be called state ①). The control means 114 monitors whether the time code which the time code input/output means 107 inputs is updated; and when the time code is updated, then the processing shown in FIG. 4 is started.

While in state ①, it is hereby assumed that the time code inputted from the time code input/output means 107 advances to become a time data of 00 hours, 00 minutes, 02 seconds, 00 frames. The time code comparison means 109 recognizes that the time code has changed from a time data of 00 hours, 00 minutes, 01 seconds, 29 frames to the time data of 00 hours, 00 minutes, 02 seconds, 00 frames (step 401) and judges whether this time code coincides with a time code registered in any of the entries in the time code table 108 (step 402).

If the time code coincides with a time code registered in any of the entries in the time code table 108 (for example, the first entry), and branching for that entry is enabled (step 402), then the time code comparison means 109 modifies the execution position of the script execution location specifying means 112 to the beginning position of line 210 that is shown in FIG. 2, which is registered first in the time code table 108, and performs processing that enables the script processing startup flag. As a result, the execution position of the next script data item is changed.

When step 403 ends, the control means 114 starts the task of the script analysis and execution means 111. The command "PLAYGO" on line 210 in FIG. 2 is recognized by the script analysis and execution means 111 (step 317).

After the command "PLAYGO" is recognized, in step 318 the script analysis and execution means 111 starts reproduction and output of the "MENU.MPG" file which is video data and stored into a buffer in advance. In cases where time codes are shared between this reproduction apparatus and other reproduction apparatus that is different from the reproduction apparatus, with one side generating and another side receiving time codes, if the same script data is executed, then reproduction and output of the "MENU.MPG" video data start with the same timing.

After starting output of video data, in processing that sets the execution line number flag (step 327), the script analysis and execution means 111 modifies the execution position held by the script execution location specifying means 112 to the beginning of line 211 in FIG. 2, disables the script processing startup flag, and ends this cycle of processing of the script analysis and execution means 111.

In processing that sets the execution line number flag (step 327), because the script processing startup flag has been disabled, the control means 114 does not start the task of the script analysis and execution means 111 during reproduction and output of the "MENU.MPG" video data (this state will be called state ②).

The control means 114 monitors the end of reproduced data when any data is in reproduction state. When reproduction of the "MENU.MPG" video data ends, the control means 114 enables the script processing startup flag held by the script execution location specifying means 112, and starts the task of the script analysis and execution means 111.

In the task of the script analysis and execution means 111 of the previous cycle, the execution position is set at the beginning of line 211 in FIG. 2. Accordingly, the command "PLAY" on line 211 in FIG. 2 is recognized by the script analysis and execution means 111 (step 325)

After the command "PLAY" is recognized, in step 326 the script analysis and execution means 111 reproduces and outputs the "MAIN.MPG" file, which is video data. In step 326, a series of processing is performed in which the data of step 314 is stored to a buffer, and reproduction of the data of step 318 is begun.

In step 326, after the start of output of the "MAIN.MPG" video data, in processing that sets the execution line number flag (step 327), the script analysis and execution means 111 modifies the execution position held by the script execution location specifying means 112 to the beginning of line 212 in FIG. 2, disables the script processing startup flag, and starts the task of the script analysis and execution means 111.

In processing that sets the execution line number flag (step 327), because the script processing startup flag has been disabled, the control means 114 does not start the task of the script analysis and execution means 111 during reproduction and output of the "MAIN.MPG" video data (this state will be called state ③).

During reproduction of the "MAIN.MPG" video data, the control means 114 monitors the end of the video data. When reproduction of the "MAIN.MPG" video data ends, the control means 114 enables the script processing startup flag held by the script execution location specifying means 112, and starts the task of the script analysis and execution means 111.

In the task of the script analysis and execution means 111 of the previous cycle, the execution position is set to the beginning of line 212 in FIG. 2. Therefore, the script analysis and execution means 111 recognizes the command "GOTO" on line 212 of FIG. 2 (step 323).

After the command "GOTO" is recognized, because the command "GOTO" means the unconditional branch of the execution line, in step 324, the script analysis and execution means 111 modifies the execution position, which is held by the script execution location specifying means 112 in the processing that sets the execution line number flag (step 327), to the beginning of line 206 in FIG. 2, which is the position following the line with the label "MENU 0".

Further, the script analysis and execution means 111 enables the script processing startup flag, thus ending this cycle of processing of the task of the script analysis and execution means 111.

The control means 114 starts the task of the script analysis and execution means 111, and processing of line 206 and subsequent lines in FIG. 2 is repeated similarly to the previous cycle.

Figure 5:
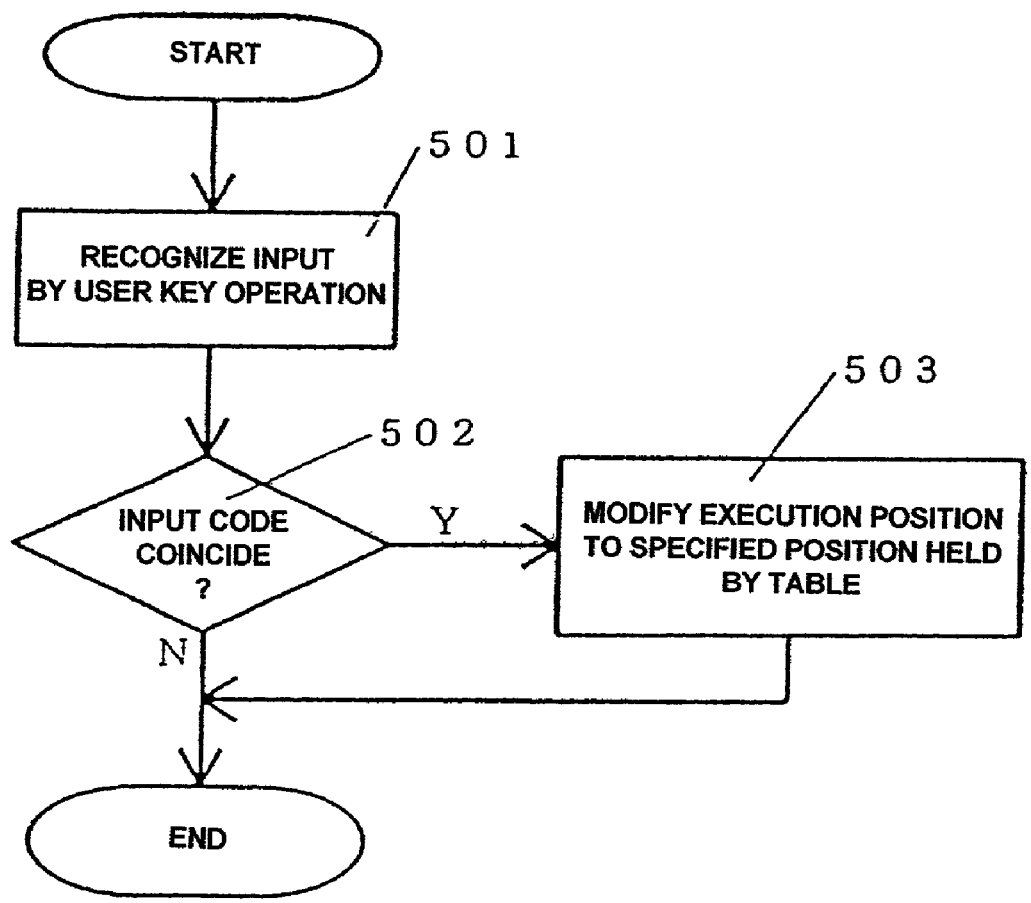
FIG. 5 is a flowchart that shows the operation of input code comparison means of the data reproduction apparatus according to one embodiment of the present invention.

FIG. 5 is a flowchart that describes the operation of the input code comparison means of the data reproduction apparatus of the shown embodiment.

The control means 114 monitors input operations by the user using the user operation input means 101; and when there is a user input operation, the control means 114 starts the processing shown in FIG. 5.

When, at an arbitrary time after execution of line 204 in FIG. 2, the key "A" is pressed in the user operation input means 101 (step 501), the input code comparison means 103 receives the input code (key code "1") from the user operation input means 101 and judges whether the input code coincides with an input code registered in any entry in the input code table 102 (step 502).

If the input code from the user operation input means 101 coincides with the input code registered in any entry (for example, the first entry) in the input code table 102, and if branching is enabled for the entry (step 502), then the script analysis and execution means 111 modifies the execution position held by the script execution location specifying means 112 to the beginning position of line 218 in FIG. 2 that is registered in the first entry of the time code table 108 (step 503), and performs processing to enable the script processing startup flag. As a result, the script data execution position in the next cycle is changed.

When step 503 ends, the control means 114 starts the task of the script analysis and execution means 111. The command "STOP" of line 218 in FIG. 2 is recognized by the script analysis and execution means 111 (step 315).

After the command "STOP" is recognized, in step 315 the script analysis and execution means 111 performs processing to stop video data being reproduced. After video data reproduction is halted, in processing that sets the execution line number flag (step 327), the script analysis and execution means 111 modifies the execution position held by the script execution location specifying means 112 to the beginning of line 219 in FIG. 2, enables the script processing startup flag, and ends this cycle of processing of the task of the script analysis and execution means 111.

The control means 114 starts the task of the script analysis and execution means 111. The command "ONKEYGO" of line 219 in FIG. 2 is recognized by the script analysis and execution means 111 (step 303).

After the command "ONKEYGO" is recognized, in step 304, because the parameter "%OFF" in line 219 of FIG. 2 means disabling of the table, the script analysis and execution means 111 sets the branch enable/disable flag so that such referencing of the first entry registered in the input code table 102 is disabled.

Then, in processing that sets the execution line number flag (step 327), the script analysis and execution means 111 modifies the execution position held by the script execution location specifying means 112 to the beginning of line 220 in FIG. 2, enables the script processing startup flag, and ends this cycle of processing of the task of the script analysis and execution means 111. As a result, branching does not occur on operation of the key "A" by the user.

The control means 114 starts the task of the script analysis and execution means 111. The command "PLAY" of line 220 in FIG. 2 is recognized by the script analysis and execution means 111 (step 325).

After the command "PLAY" is recognized, in step 326 the script analysis and execution means 111 performs processing to reproduce the "SPECLAL.MPG" video data. After reproduction and output of the video data has begun, in processing that sets the execution line number flag (step 327), the script analysis and execution means 111 modifies the execution position held by the script execution location specifying means 112 to the beginning of line 221 in FIG. 2, disables the script processing startup flag, and ends this cycle of processing of the task of the script analysis and execution means 111.

The control means 114 monitors the end of the "SPECIAL.MPG" video data being reproduced; and when reproduction of the "SPECIAL.MPG" video data ends, again the control means 114 enables the script processing startup flag held by the script execution location specifying means 112, and starts the task of the script analysis and execution means 111. The script analysis and execution means 111 recognizes the command "ONKEYGO" of line 221 in FIG. 2 (step 303).

After the command "ONKEYGO" is recognized, in step 304 the script analysis and execution means 111 records "2", which is the input code for the key "B", in the first entry of the input code table 102, and records the beginning position of line 218 in FIG. 2 as the next scheduled execution position. Also, branching caused by the key code is set so as to be enabled.

Then, in processing that sets the execution line number flag (step 327), the script analysis and execution means 111 modifies the execution position held by the script execution location specifying means 112 to the beginning of line 222 in FIG. 2, enables the script processing startup flag, and ends this cycle of processing of the task of the script analysis and execution means 111.

The control means 114 starts the task of the script analysis and execution means 111. The script analysis and execution means 111 recognizes the command "GOTO" of line 222 of FIG. 2 (step 323).

After the command "GOTO" is recognized, in step 324 the script analysis and execution means 111 modifies the execution position held by the script execution location specifying means 112 to the beginning of line 206 in FIG. 2, which is the next point after the label "MENU 0", enables the script processing startup flag, and ends this cycle of processing of the task of the script analysis and execution means 111.

The control means 114 starts the script analysis and execution means 111. The script analysis and execution means 111 again continues execution of script data from the command of line 206 in FIG. 2. Operations to process line 206 and subsequent lines in FIG. 2 are described in the above and are, therefore, omitted.

Figure 6:
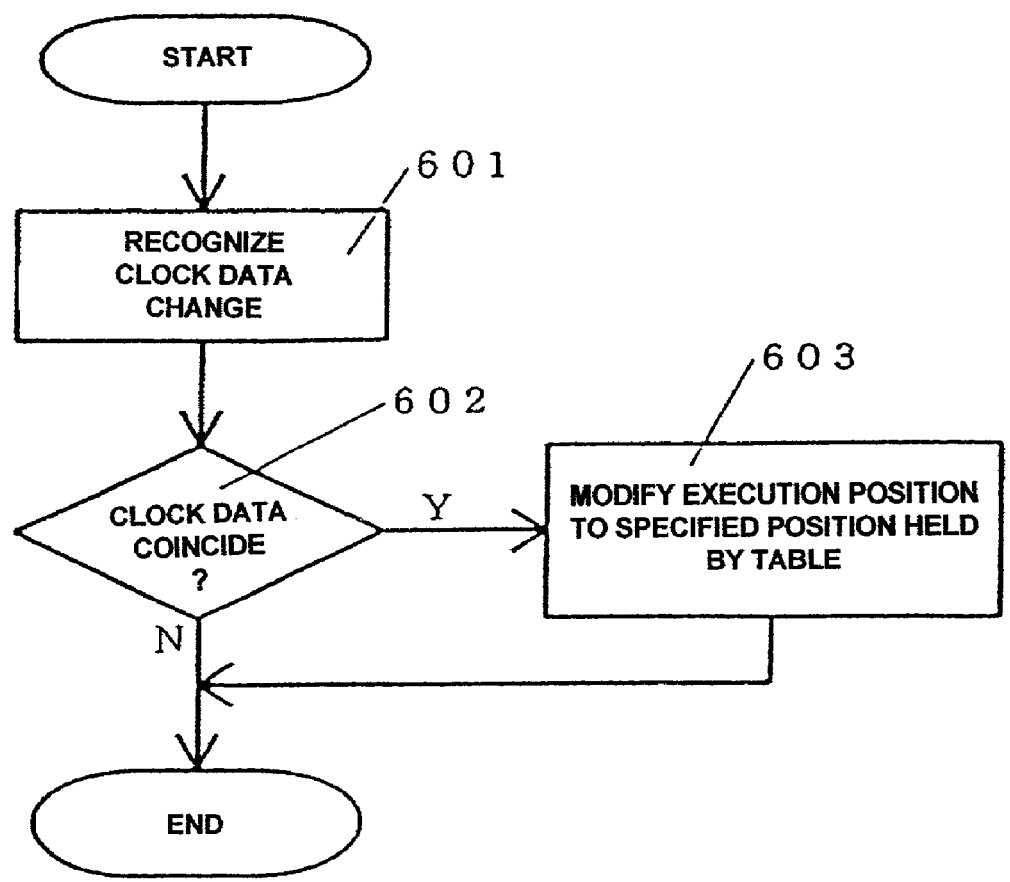
FIG. 6 is a flowchart that shows the operation of clock data comparison means of the data reproduction apparatus according to one embodiment of the present invention.

FIG. 6 is a flowchart that describes the operation of the clock data comparison means of the data reproduction apparatus of the shown embodiment.

The control means 114 monitors the update of the clock data output from the clock data output means 104; and if there is an update of clock data, the processing shown in FIG. 6 is started.

In FIG. 6, updates of the clock data output from the clock data output means 104 are monitored (step 601), and a judgment is made as to whether the clock data from the clock data output means 104 coincides with the clock data (date and time data) registered in any of the entries of the clock data table 105 (step 602).

It is hereby assumed here that the output data of the clock data output means 104 is updated to 12:00:00 of Mar. 1, 2000 at an arbitrary time after execution of line 202 in FIG. 2. Then, when the clock data comparison means 106, upon recognizing the fact that the date and time data is updated to "00-03-01/12:00:00", judges that this updated date and time data coincides with the first date and time data registered in one of the entries (for example, the first entry) in the clock data table 105 (step 602), then the clock data comparison means 106 modifies the execution position held by the script execution location specifying means 112 to the beginning position of line 214 of FIG. 2, which is the first registered entry in the time code table 108 (step 603), enables the script processing startup flag, and terminates. In step 603, processing similar to that in step 327 in FIG. 3 is performed.

After the end of processing in step 603, the control means 114 starts the script analysis and execution means 111. The script analysis and execution means 111 recognizes the command "STOP" of line 214 in FIG. 2 (step 315).

After the command "STOP" is recognized, in step 316 the script analysis and execution means 111 performs processing to halt the reproduction of video data being reproduced. After this data reproduction is halted, in processing that sets the execution line number flag (step 327), the script analysis and execution means 111 modifies the execution position held by the script execution location specifying means 112 to the beginning of line 215 in FIG. 2, enables the script processing startup flag, and ends this cycle of processing of the task of the script analysis and execution means 111.

The control means 114 starts the task of the script analysis and execution means 111. The script analysis and execution means 111 recognizes the command "PLAY" of line 215 in FIG. 2 (step 325).

After recognition of the command "PLAY", in step 326 the script analysis and execution means 111 performs processing that reproduces "12JIHOU.WAV", which is audio data and indicated in line 215 of FIG. 2. After the start of data reproduction and output, in processing that sets the execution line number flag (step 327), the script analysis and execution means 111 modifies the execution position held by the script execution location specifying means 112 to the beginning of line 216 in FIG. 2, disables the script processing startup flag, and ends this cycle of processing of the task of the script analysis and execution means 111.

The control means 114 monitors the end of the "12JIHOU.WAV" audio data being reproduced; and when reproduction of the "12JIHOU.WAV" audio data ends, it enables the script processing startup flag held by the script execution location specifying means 112, and ends this cycle of processing of the task of the script analysis and execution means 111.

The control means 114 starts the task of the script analysis and execution means 111. The script analysis and execution means 111 recognizes the command "GOTO" of line 216 in FIG. 2 (step 323).

After the command "GOTO" is recognized, in step 324 the script analysis and execution means 111 modifies the execution position held by the script execution location specifying means 112 to the beginning of line 206 in FIG. 2, which is the next point after the "MENU 0" label, enables the script processing startup flag, and ends this cycle of processing of the task of the script analysis and execution means 111.

The control means 114 starts the task of the script analysis and execution means 111. The script analysis and execution means 111 recognizes the command of line 205 in FIG. 2, and again continues execution of the script from line 205.

Operations to process line 206 and subsequent lines in FIG. 2 have already been described, and are omitted.

As described in detail in the above, in the present invention, the script processing startup flag is disabled when reproduction of video and audio data which is a process that extends for a long period of time is executed; and during the task of the script analysis and execution means 11, other processing is not executed until the reproduction of such video and audio data is ended; in other cases, the script processing startup flag is enabled; as a result, the next processing can be performed continuously following the processing being executed.

Accordingly, an instruction that executes processing determined in advance as a result of user operation input can be written in a script execution location in the script data. Thus, it is not necessary to describe settings for the timing of user operations alone in the script file; and by way of describing a simple script data, user input can cause other processing to be executed during execution of data reproduction or other processes in the data reproduction apparatus.

Also, a description of processing that reproduces data determined in advance at a specific date and time can be inserted in a script execution location in the script data. Thus, by executing a simple script data description, it is possible to reproduce the data determined in advance at a particular date and time by the data reproduction apparatus.

Further, a description of processing that starts reproduction of data determined in advance can be inserted in a script execution location in the script data. Thus, by executing a simple script data description, it is possible to output a plurality of data items synchronously between equipment units that shares time codes.

As seen from the above, according to the present invention, such operations as to start the reproduction of data by user input, to start the reproduction of data at a pre-set time, and to synchronously output a plurality of different data items, can be performed by a program that is written with concise script data.

The invention claimed is:

1. A data reproduction apparatus comprising:
a data accumulation means that accumulates a plurality of types of data and a script file which contains a description specifying an execution position of a script data;
a data reproduction means that reproduces data accumulated in the data accumulation means;
a user operation input means that outputs input codes which correspond to input by user operation;
a script analysis and execution means witch performs script processing that recognizes commands described in the script data and execute processing that corresponds to the commands;
a table that holds a branch destination corresponding to the input codes for the script analysis and execution means to execute;
a script execution location specifying means which holds a next scheduled position in the script file for the script analysis and execution means to execute; wherein
the script analysis and execution means
1) performs the script processing according to the commands described in the script data of the next scheduled execution position in the script file held the script execution location specifying means,
2) modifies the next scheduled execution position,
3) controls the data reproduction means to reproduce data accumulated in the data accumulation means when the command is recognized as indication data reproduction thereof, and
4) records the execution position of the script data as the branch destination corresponding to the input codes held in the table when the command is recognized as a specific command indicating that the script data processed contains the description specifying the execution position of the script data according to the input codes; and
the script execution location specifying means which modifies the next scheduled execution position to the branch destination held in the table corresponding to the input codes when the input codes output from the user operation input means coincides with the input codes held in the table.

2. The data reproduction apparatus according to claim 1, wherein
the script execution location specifying means holds in corresponding relationship A) a next scheduled position in the script file for the script analysis and execution means to execute end B) a flag that indicates whether or not the script analysis and execution means should perform execution from the next scheduled position, and
the script analysis and execution means performs the script processing according to the commands described in the script data of the next scheduled execution position in the script file held by the script execution location specifying means, when the flag indicates processing is to be performed, and modifies the next scheduled execution position and the flag after performing the script processing.

3. A data reproduction apparatus comprising:
a data accumulation means that accumulates a plurality of types of data and a script file which contains a description specifying an execution position of a script data;
a data reproduction means that reproduces data accumulated in the data accumulation means;
a clock data output means that outputs clock data;
a script analysis and execution means which performs script processing that recognizes commands described in the script data and executes processing that corresponds to the commands;
a table that holds a branch destination corresponding to the clock data for the script analysis and execution means to execute;
a script execution location specifying means which holds a next scheduled position in the script file for the script analysis and execution means to execute; wherein
the script analysis and execution means
1) performs the script processing according to the commands described in the script data of the next scheduled execution position in the script file held by the script execution location specifying means, when the flag indicates processing is to be performed,
2) modifies the next scheduled execution position,
3) controls the data reproduction means to reproduce data accumulated in the data accumulation means when the command is recognized as indication data reproduction thereof, and
4) records the execution position of the script data as the branch destination corresponding to the clock data held in the table when the command is recognized as a specific command indicating that the script data processed contains the description specifying the execution position of the script data according to the clock data; and the script execution location specifying means which modifies the next scheduled execution position to the branch destination held in the table corresponding to the clock data, when the clock data output from the clock data output means coincides with the clock data held in the table.

4. The data reproduction apparatus according to claim 3, wherein the script execution location specifying means holds in corresponding relationship A) a next scheduled position in the script file for the script analysis and execution means to execute and B) a flag that indicates whether or not the script analysis and execution means should perform execution from the next scheduled execution position, and the script analysis and execution means performs the script processing according to the commands described in the script data of the next scheduled execution position in the script file held by the script execution location specifying means, when the flag indicates processing is to be performed, and modifies the next scheduled execution position and the flag after performing the script processing.

5. A data reproduction apparatus comprising:

a data accumulation means that accumulates a plurality of types of data and a script file which contains a description specifying an execution position of a script data;

a data reproduction means that reproduces data accumulated in the data accumulation means;

a time code input/output means that generates a time code and receives a time code inputted from outside;

a script analysis and execution means which performs script processing that recognizes commands described in the script data and executes processing that corresponds to the commands;

a table that holds a branch destination corresponding to the time codes for the script analysis and execution means to execute;

a script execution location specifying means which holds a next scheduled position in the script file for the script analysis and execution means to execute; wherein the script analysis and execution means
1) performs the script processing according to the commands described in the script data of the next scheduled execution position in the script file held by the script execution location specifying means,
2) modifies the next scheduled execution position,
3) controls the data reproduction means to reproduce data accumulated in the data accumulation means when the command is recognized as indication data reproduction thereof, and
4) records the execution position of the script data as the branch destination corresponding to the dine codes held in the table when the command is recognized as a specific command indicating that the script data processed contains the description specifying the execution position of the script data according to the time codes; and the script execution location specifying means which modifies the next scheduled execution position to the branch destination held in the table corresponding to the time codes, when the timed code output from time code input/output means coincides with the time codes held in the table.

6. The data reproduction apparatus according to claim 5, wherein the script execution location specifying means holds in corresponding relationship A) a next scheduled position in the script file for the script analysis and execution means to execute and B) a flag that indicates whether or not the script analysis and execution means should perform execution from the next scheduled execution position, and the script analysis and execution means performs the script processing according to the commands described in the script data of the next scheduled execution position in the script file held by the script execution location specifying means, when the flag indicates processing is to be performed, and modifies the next scheduled execution position and the flag alter performing the script processing.

* * * * *